OR  3,807,831

United States Patent [19]
Soref

[11] 3,807,831
[45] Apr. 30, 1974

[54] LIQUID CRYSTAL DISPLAY APPARATUS
[75] Inventor: Richard A. Soref, Chestnut Hill, Mass.
[73] Assignee: Beckman Instruments, Inc., Fullerton, Calif.
[22] Filed: June 20, 1972
[21] Appl. No.: 264,679

[52] U.S. Cl............ 350/150, 350/160 LC, 340/336
[51] Int. Cl. .............................................. G02f 1/16
[58] Field of Search............ 350/150, 160 R, 160 LC

[56] References Cited
UNITED STATES PATENTS
3,674,342  7/1972  Castellano et al. ............ 350/160 LC
3,694,053  9/1972  Kahn................................. 350/150
3,592,527  7/1971  Conners et al. ............... 350/160 LC
3,499,112  3/1970  Heilmeier et al. ......... 350/160 LC X
3,674,341  7/1972  Hedman, Jr. et al. ........ 350/160 LC Primary Examiner—Edward S. Bauer
Attorney, Agent, or Firm—Robert J. Steinmeyer; James M. Thomson

[57] ABSTRACT

A flat screen, electrically controlled, display device is provided that includes a very thin layer of liquid crystalline material of the nematic type. The liquid crystal material is one whose optical phase shift transmission is a sensitive and direct function of the electric field within it, allowing controlled optical transmission in conjunction with polarizers. The nematic material is placed in a flat-sided cell between transparent planar front and rear cell elements which define the thickness of the nematic layer. Birefringence of the nematic liquid crystal is controlled by voltages applied to interleaved arrays of alternate parallel electrodes coated on the inner surface of only one of the transparent cell elements.

13 Claims, 12 Drawing Figures

LIQUID CRYSTAL DISPLAY APPARATUS

BACKGROUND OF THE INVENTION

1. Field of the Invention

The invention relates to electrically controllable panel display devices employing liquid crystalline materials as electrically active media and more particularly relates to such display devices in which the size, shape, and location of two-dimensional display patterns can be changed in discrete steps.

2. Description of the Prior Art

Nematic liquid crystal materials have been found in the past to offer utility, for example, in electrically controlled display devices of the flat panel type. For instance, one prior art application of electrically controllable dynamic scattering materials employs a structure which is a cell generally of sandwich configuration comprising a front set of transparent planar electrodes and a specularly reflective back electrode spaced from the front electrode system. Between the two electrode systems is located a layer of active nematic material. With no electric field applied between the two electrode sets, the liquid crystal material is optically transparent. Thus, if the back electrode reflects a black background, the cell looks black to a viewer looking into it through its transparent front electrode system. However, when a unidirectional or alternating electric field is applied between the two spaced electrode systems, the liquid abruptly loses its transparent characteristic, scattering any light flowing into it through its transparent front electrode system. In this state, the scattered light is returned to the viewer, and the apparent color of the cell is generally of the same spectral content as the light passing into it through the front electrode system; i.e., nearly white in the usual circumstance. When the electric field is removed, the material abruptly reverts to its transparent state and looks black to the observer.

The scattering effect of these prior art devices in the presence of an electric field has been explained as being caused by localized variations in the effective index of refraction of the medium produced when groups of neutral molecules within the medium are set into motion by the electrical current produced by the electric field. Ions set in motion pass through the normally aligned nematic medium and thereby supply shearing disruptive effects.

Such prior art displays have made advantageous use of the several properties of liquid crystal compositions. These displays require electrode systems on surfaces of both the front and the back elements of the cell, which electrode systems generally require careful alignment during assembly and are therefore expensive to produce. Such prior art devices, having conducting electrodes on each side of the nematic layer, are also subject to accidental short circuiting between electrode systems. A factor further degrading the life of these prior displays is that the primary phenomena producing the display is induced by electrical current flow, rather than by effects directly caused by the electric control field. Such substantial current flow tends to cause the liquid crystal materials to deteriorate, reducing the life span of the display. Relatively high operating power is also required.

SUMMARY OF THE INVENTION

The invention is an electric-field controlled, electro-optical display device of the panel type which includes a very thin layer of nematic liquid crystalline material directly responsive to electric fields imposed upon the nematic material. The nematic material is placed within a thin cell having transparent frontal and rear cell elements which are generally parallel and which may have flat sides, though parallel curved sides may be employed. The electric control field threading the nematic layer is provided by an array of electrodes placed on only one inner surface of one of the cell-defining elements. Birefringence of the nematic liquid crystal is controlled by selected voltages applied to interleaved or interdigital electrode sets which constitute a pair of cooperating electrode systems, the pair being coated on the one inner surface of the one cell side. Alignment of the elements of the electrode sets may thus be accomplished automatically in one photographic step, manufacture and assembly of the device thus being significantly simplified. Since electric control field effects are employed, operating power is reduced and the life expectancy of the display cell is increased.

DESCRIPTION OF THE PREFERRED EMBODIMENTS

Figure 1:
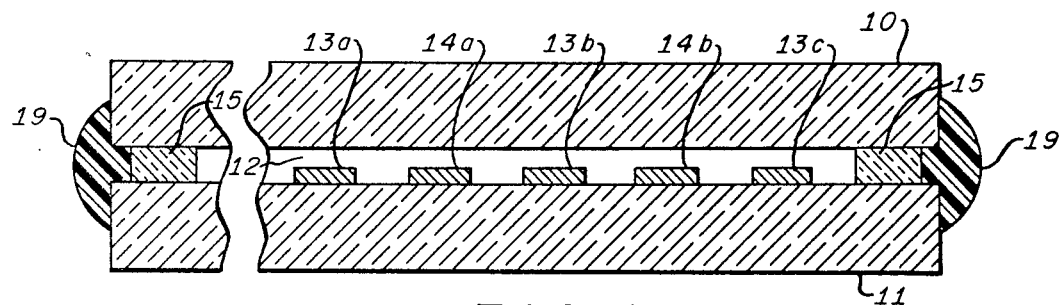
FIG. 1 is a cross section view of one form of the invention.
Figure 2:
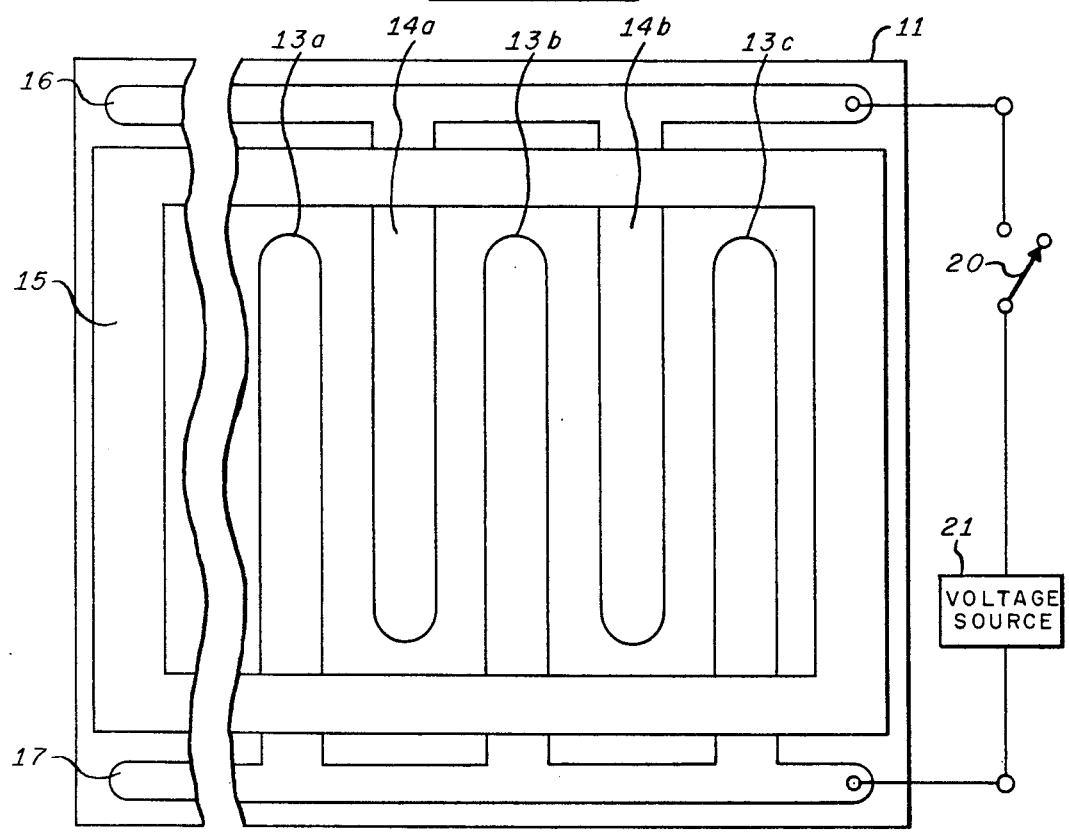
FIG. 2 is a plan view of the apparatus of FIG. 1 with certain parts removed to expose its interior to view.

Referring now to FIGS. 1 and 2, a typical construction for the invention is shown as utilizing a pair of generally parallel sided flat glass or dielectric plates 10 and 11 preferably arranged parallel to each other and separated by a very thin layer 12 of electric field sensitive nematic material. Plates 10 and 11 are normally optically flat, but may be arbitrarily curved while still maintaining a parallel relationship. Only substrate plate 11 is coated on its inner surface with thin conducting electrode means, such as electrodes 13a, 13b, 13c and 14a, 14b. A cell for containing the nematic material is further defined, for example, by a continuous quadrilateral dielectric wall or enclosure means 15. Extended lineal or elongate terminals 16 and 17 are applied respectively in conductive relation with electrodes 13a, 13b, 13c, and 14a, 14b on glass plate or dielectric substrate means 11 at opposite ends of that plate. By virtue of their relatively low resistance, terminals 16 and 17 and the associated electrodes are substantially equipotential surfaces. Terminals 16, 17 are coupled across a series connected switch 20 and voltage source 21; voltage source 21 may be a direct or alternating voltage source, as preferred. It is seen that any adjacent pair of electrodes, such as electrodes 13a and 14a, are adapted in themselves to form the electric field lying between them.

Dielectric plates 10 and 11 may be constructed from any suitable glass or generally from a transparent insulating material compatible with the optical requirements of the cell system. For example, the material may be selected to have an optical index of refraction similar to that of the electric field sensitive or nematic material 12 so as to avoid undesired reflections at optical interfaces.

The transparent conducting electrodes 13 and 14 on substrate 11 may be made of tin oxide, indium oxide, or similar conducting materials put down on substrate 11 by chemical or evaporative deposition, by sputtering, or by other suitable known methods. Construction may be by conventional photolithographic etching of a transparent conductive vacuum-sputtered coating of indium oxide on a clean surface of plate 11. The choice of materials is such that conducting electrodes 16 and 17 and their associated electrodes have a low resistivity of the order of 100 ohms per square, for example. The center-to-center spacing of adjacent electrode pairs, such as electrodes 13a, 14a, is substantially constant and may be of the order of 10 to 40 microns, with the widths of the electrodes of the order of 30 to 50 per cent of the center-to-center spacing, which ensures that the full operating voltage will be less than 100 volts. The thickness of the electric field sensitive or nematic layer 12 must be very much smaller than that used in prior art liquid crystal devices (about 0.5 to 1.5 microns, for instance, a value necessarily much smaller than is employed in conventional liquid crystal displays).

So that the liquid crystal layer 12 may be contained in its pure form, protected from contaminants, and be of uniform thickness, dielectric wall 15 is preferably formed as a continuous enclosure wall; it is readily constructed of a tape available in the market made of a polymerized fluorocarbon resin material or of a suitable glass etched in the form of the very thin shims required. The cell may be held together at least in part by an external film 19 of epoxy material applied to the external free surface of wall 15 so that it bonds to that surface and to the adjacent exterior surfaces of glass plates 10, 11.

Referring especially to FIG. 2, it will be seen that particular arrays of electrodes such as array electrodes 13a, 13b, 13c and array electrodes 14a, 14b, have been shown; it will be understood that the figures are drawn particularly for illustrating the basic principles of the invention with clarity. In actual practice, an array of many thin and closely spaced electrodes 13a, 13b, 13c, ..., 13n, will be used, with many closely spaced interdigitally located electrodes 14a, 14b, ..., 14n. Electrodes 13a, 13b, 13c, ... 13n may be instantaneously negative, for instance, when switch 20 is closed, while electrodes 14a, 14b, ..., 14n may be instantaneously positive. In such a case, instantaneous electric fields are set up between the several alternate electrodes. As in FIGS. 3 and 4, an electric field of one sense is found in the region between the oppositely poled electrodes 13a, 14a, while an electric field of a reversed sense is found between electrodes 14a, 13b, and so on throughout the interleaved arrays of electrodes until electrodes 13n, 14n are reached.

It will be understood that the observer may view the state of the nematic liquid layer 12 in FIG. 1 from above it or from below, as will yet be discussed in connection with FIGS. 5 through 10, and that ambient light may be used, as well as a deliberately introduced discrete light source. It will also be understood by those skilled in the art that FIG. 2 is drawn for purposes of clarity as if the upper glass plate of FIG. 1 and not yet been put in place and the external epoxy seal 19 had not yet been formed. Thus, the observer directly views the top of quadrilateral wall 15 and the electrode system.

The very thin layer 12 of nematic material may be formed of any of several nematic liquid crystal materials or mixtures thereof, the materials having either positive or negative anisotropy. The room temperature materials described in the M. J. Rafuse U.S. Pat. application Ser. No. 128,666 for "Liquid Crystal Compositions and Devices," filed Mar. 29, 1971, now U.S. Pat. No. 3,675,987 and assigned to the Sperry Rand Corporation are of interest, as well as prior art materials of the well known cyanoaniline or nitrile type or other Schiff bases such as tend to align their long axes substantially parallel to an applied electric field. Materials are useful such as tend also to align themselves perpendicular to the inner surfaces of the clean glass plates 10 and 11.

The thin homeotropic nematic layer 12, with its molecules perpendicular to dielectric plates 10 and 11, is obtained by maintaining extreme cleanliness of the inner surfaces of the plates. Liquid crystals of high purity are used that have a $10^9$ and $10^{13}$ ohm-centimeter resistivity. Materials of either positive or negative anisotropy may be employed. For example, one may define a critical frequency $f_c$ by the relation $f_c = \sigma/2\pi\epsilon$ where $f_c$ is the space charge relaxation frequency, $\sigma$ is specific electrical conductivity, and $\epsilon$ is the dielectric constant of the liquid crystal material. The value of $f_c$ is about 100 Hz for representative materials.

Figures 3, 4:
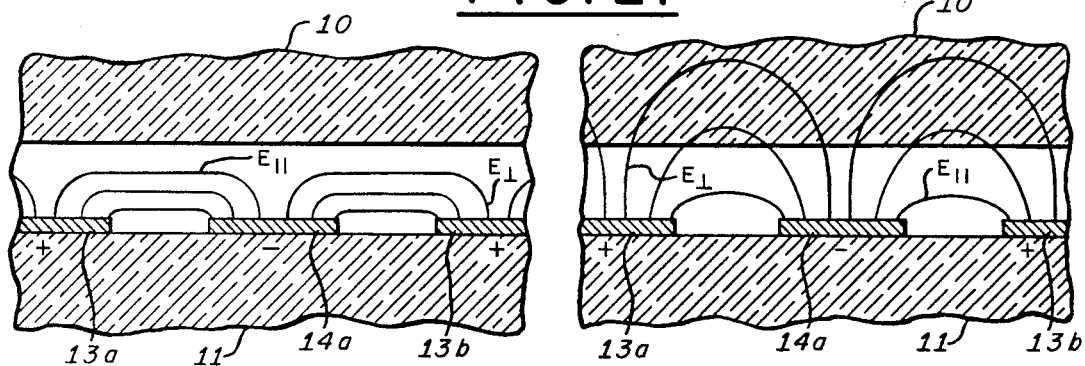
FIGS. 3 and 4 are enlarged partial views similar to FIG. 1 for illustrating the electric control fields used in the invention.
Figure 5:
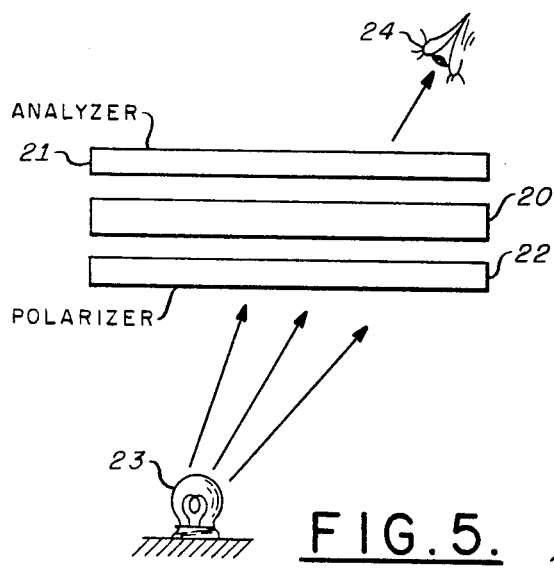
FIG. 5 is a side view of a form of the invention utilizing transmitted light.

FIG. 3 is a representation of those electric field lines from electrodes 13a, 14a which penetrate the liquid crystal layer 12 for what may be called low frequencies ($f < f_c$). Here the fringing field components $E_\perp$ have small effect on the liquid crystal medium 12, the major effect being due to the transverse electric field components $E_\parallel$. For high frequencies, $f > f_c$ and the fringing electric field components $E_\perp$ dominate the transverse field components $E_\parallel$. According to the invention, liquid crystal materials selected from those displaying positive dielectric anisotropy may be selected particularly for the FIG. 3 situation, since positive anisotropy materials (initially homeotropic) are most sensitive to the $E_\parallel$ transverse field components. On the other hand, negative dielectric anisotropy liquid crystal materials are particularly suited for the arrangement of FIG. 4, because such homeotropic materials are particularly sensitive to the fringing field components $E_\perp$. However, either positive or negative anisotropy materials are field-controllable in either situation (FIG. 3 or FIG. 4).

Figure 6:
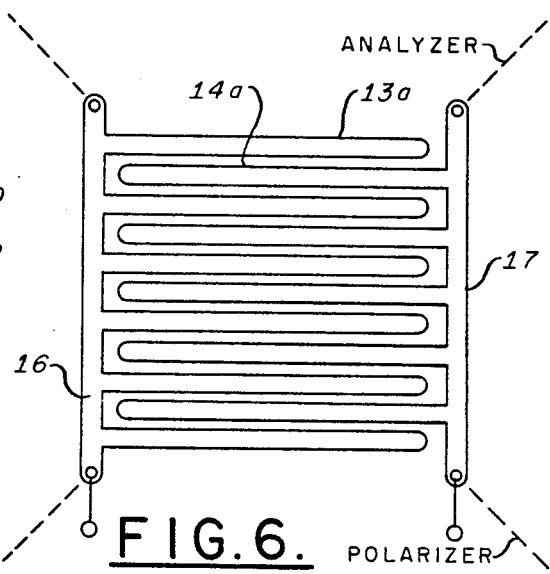
FIG. 6 is a partial plan view of the electrode system of the apparatus of FIG. 5.

As previously noted, the novel liquid crystal device may be advantageously viewed from either side; it may also be used in transmission and reflection modes. For example, in FIGS. 5 and 6, the novel liquid crystal device is identified by reference numeral 20 and is seen placed between a conventional polarization analyzer 21 and a conventional polarizer 22 with illumination from a discrete light source 23 passing through polarizer 22, through the novel liquid crystal device 20 and analyzer 21, and into the eye 24 of the observer. Generally, the electric field polarization planes of the devices 21, 22 will be mutually at right angles and at 45° to the electrodes 13a, 14a, for example, as shown in FIG. 6. In the transmission mode, the presence of the electric field permits transmission of light from the discrete source 23 to the eye 24 through the area between electrodes; in the absence of the electric field, the region between electrodes 13a, 14a is dark. The electrodes themselves are also dark. The dark and light states may be reversed by making the polarization planes of the polarizer 22 and the analyzer 21 mutually parallel and at 45° to electrodes 13a, 14a, for example. In any event, the in-coming light is polarized 45° to the direction of the applied field; i.e., it is at 45° to electrodes 13a, 14a, for example. The elements 20, 21, 22, and 23 may be supported in the appropriate manner by ordinary mechanical elements (not shown), as is obvious to one skilled in the art.

The versatility of the invention is further illustrated by the fact that reflection operation, as illustrated in FIGS. 7 through 10, is possible in several different configurations which are found to compete quite well with conventional dynamic scattering or turbulence displays. In the FIG. 7 construction, a single circular polarizing element 25 (a linear polarizer and quarter-wave plate) is employed with a source of diffuse light rays 29. The rays 29 pass through the novel liquid crystal device 20 and are reflected from a diffuse mirror surface 28 on one side of a glass plate 26. The diffusing surface 28 may be formed by paint pigment particles, such as those of a layer 27 of aluminum paint or by metal coating of a roughened glass surface. After reflection from surface 28, the light again passes through the liquid crystal device 20 and through circular polarizer 25 to the eye 24 of the observer. The diffuse surface appears dark at zero electric field over a wide field of view if the homeotropic layer is very thin (between 0.5 and 1.5 microns). The arrangement of FIG. 7, of which the elements 20, 25, 26 are supported by means not shown, is particularly advantageous in view of its simplicity and of the fact that it permits a wide range of viewing angles. In the related system of FIG. 8, a discrete source 23 of light is used and a specular mirror 30 replaces the diffusing mirror 28 of FIG. 7. Elements 20, 23, 25, 30 are spaced in appropriate relation by means obvious to one skilled in the art.

Figure 7:
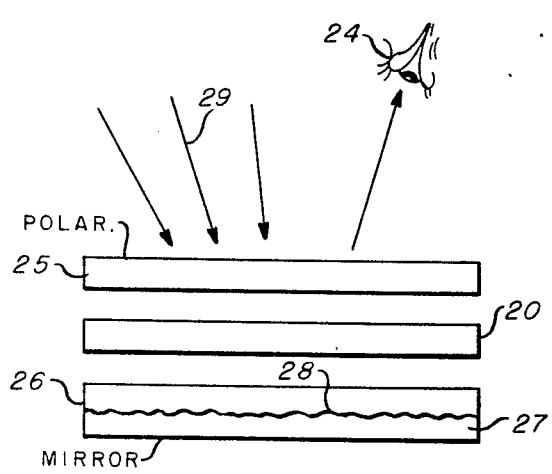
FIGS. 7 through 10 are side views similar to that of FIG. 5 of forms of the invention utilizing reflected light.
Figure 9:
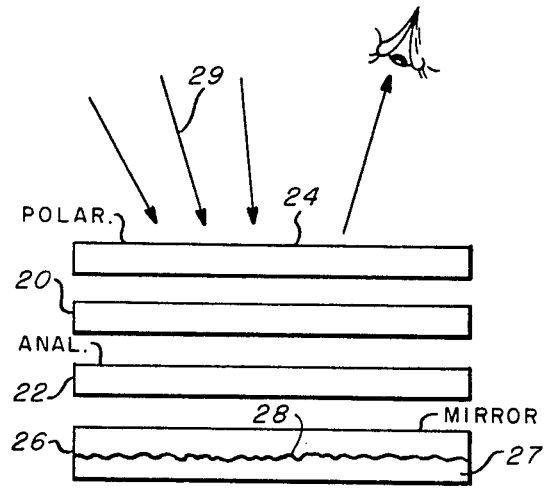
Figure 8:
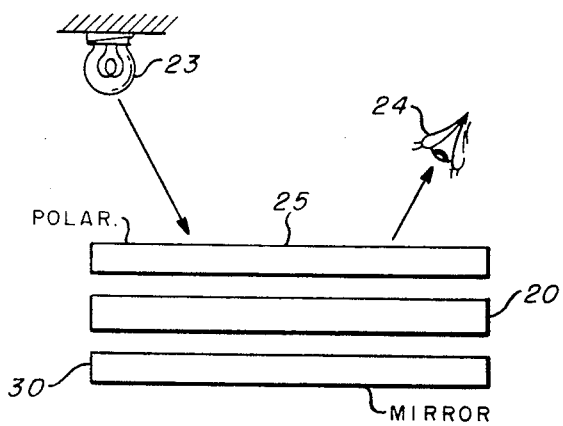
Figure 10:
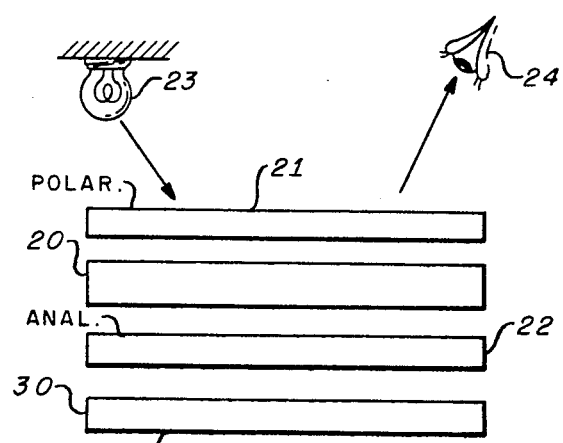

Alternatively, the diffuse lighting used in FIG. 7 may be retained, as in FIG. 9, as well as the diffusing mirror 28. The circular polarizer 25 of FIG. 7 is replaced by using a polarizer 21 through which the light rays 29 enter the liquid crystal device 20 and an analyzer 22 between device 20 and diffusing mirror 28. A variant of the FIG. 9 arrangement seen in FIG. 10 uses the discrete light source and specular mirror 30 of FIG. 8 in place of the diffuse light and diffusing mirror 28 of FIG. 9. As in FIG. 5, the polarizers and analyzers of FIGS. 9 and 10 may be mutually parallel instead of perpendicular. The various elements of FIGS. 9 and 10 may be supported by ordinary means (not shown) obvious to one skilled in the art.

It is seen that the invention is a liquid crystal electrooptic display device or light valve device in the form of a flat panel display or modulator that employs an interdigital electrode structure. The interdigital electrode array is required only at one surface of the very thin nematic film, there being no necessity for cooperating electrodes at the other surface of the nematic layer, and is therefore inexpensive to make and to assemble. The electrodes applying fringing or transverse electric field components or both with respect to the volume occupied by the very thin nematic film, so that a choice may be made between a wide variety of liquid crystals.

The applied electric field is used, for instance, to distort the normal alignment of the long nematic molecules (alignment at right angles to the major surfaces of the glass container plates) and thus to distort the nematic ordering of the material, controlling the birefringence or optical phase retardation of the film. The controlled birefringence is directly electric field sensitive and very low drive powers are effective (on the order of 10 microwatts per square centimeter of display). This is in contrast to prior art turbulence displays which operate largely because of the presence of electrical currents and therefore consume substantially greater power. Since little electrical current flows, the liquid crystal materials find themselves in an environment in which they may have relatively long life.

Since an electric field effect is used, positive dielectric anisotropy liquid crystals are readily employed as they normally do not exhibit dynamic scattering effects, but are primarily electric field sensitive. Negative dielectric anisotropy materials, which can normally be induced readily to demonstrate dynamic scattering, when used in the ultra-thin layer according to the invention, evidence only field effect operation, the alignment of the molecules due to the very thin layer and the immediate proximity of the glass plates suppressing dynamic scattering tendencies.

Below a threshold voltage that is characteristic of the particular liquid crystal material used, birefringence is very low, while above the threshold, at which a sharp transition occurs, strong optical birefringence is observed. For example, in the apparatus of FIG. 7, this causes the addressed areas to appear white against a black background. On-off contrast is several hundred to one, particularly along the axis of the display. Rise times between 20 and 80 milliseconds are representative, with fall times being about 40 milliseconds. The threshold voltage is substantially constant in the nitrile Schiff bases, for instance, from the direct current situation out to excitation frequencies as high as 200,000 Hz.

Using appropriate polarizers, diffuse or discrete light sources may be employed either in transmissive or reflective modes. The viewing angle is particularly large when diffuse illumination and a diffusing mirror are applied in the reflective mode.

Figure 11:
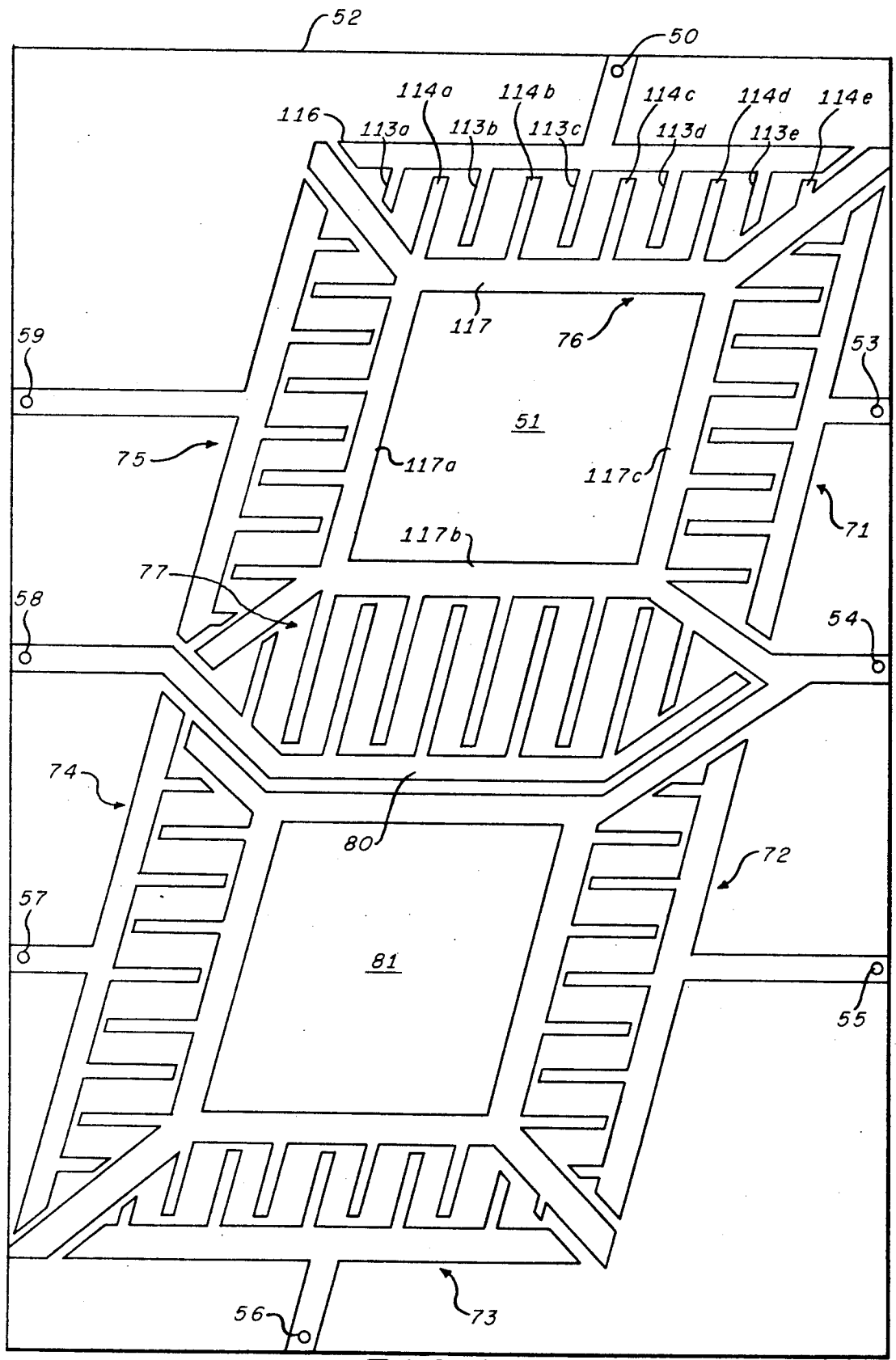
FIG. 11 is a partial plan view of the electrode system of a form of the invention for generating a numeric display.

The versatility of the invention is further evidenced by the wide variety of configurations in which it may be employed, such as the numeric display of FIG. 11. In this device, an array of regularly spaced plural electrodes 113a, 113b, . . . , 113n is arranged in regular interdigitally spaced relation with a second array of plural electrodes 114a, 114b, . . . 114n. Array 113a, . . . , 113n is conductively coupled to terminal 116 and thence to connector 50; array 114a, . . . , 114n is conductively coupled to one terminal arm 117 of a square or parallelogram made up of a conducting material such as indium oxide affixed to a transparent substrate 52 analogous to flat glass plate 11 of FIGS. 1 and 2. It will be seen that if a series connected battery and switch are placed across tap 50 and the tap 54, which latter is connected to terminal arms 117b, 117c, 117a, and 117, and the switch is closed, electric fields are induced between electrodes 113a and 114a, 113b and 114b, . . . , and 113n and 114n, inducing a change in light transferred through a very thin liquid crystal film arranged above plate 52 and therefore above the above mentioned electrodes in the manner of FIGS. 1 and 2.

Since connector 50 is independent of all other connectors 53 through 59, a light transfer change will occur only in the area associated with the several electrodes 113a, . . . , 113n and 114a, . . . , 114n. Thus, interdigital array 76 is independently operable and operates as an independent matrix display element. It will be clear, in view of the foregoing discussion that many such electrodes may be used within display element 76 and that only relatively few are shown in FIG. 11 merely as a convenience in providing clarity in the drawing. Interdigital matrix array elements 71 through 75 being similar to interdigital array element 76, it will readily be appreciated by those skilled in the art that the individual independent matrix display elements may be independently operated according to a desired program. It is seen that interdigital arrays 72, 73, 74 are associated with a conductor parallelogram 81 similar to parallelogram 51. A central interdigital array, completing the familiar seven segment display pattern often used to generate alpha-numeric displays, is formed by a first array of electrodes extending from one terminal arm 117b of parallelogram 51 and by a second interleaved array of electrodes extending from terminal 80. Terminal 80 is connected to connector 58 so that when a voltage is placed between connectors 54 and 58, the state of the nematic liquid film in the vicinity of array system 77 changes, as before. It is seen that by the proper programming of the application of potentials individually to the several connectors 50, 53, 55, 56, 57, 58, 59 with respect to the common electrode 54, any desired combination of the interdigital arrays 71 through 77 may be excited so as to form numerals 0 through 9.

It will be clear to those skilled in the art that the invention may be employed in many other matrix configurations in which cooperating interdigital arrays of various shapes and sizes are aligned in arbitrary manner on a single substrate for selective excitation. For example, a multiple-element matrix display is readily envisioned wherein a plurality of rows and columns of square interdigital arrays like that of FIGS. 1 and 2 are employed. These matrix elements may be mounted on a common transparent substrate for selective excitation of a very thin film of nematic material covered by a viewing plate, as in FIGS. 1 and 2. The sharp turn-on threshold makes possible time-sharing coincident x–y addressing.

Figure 12:
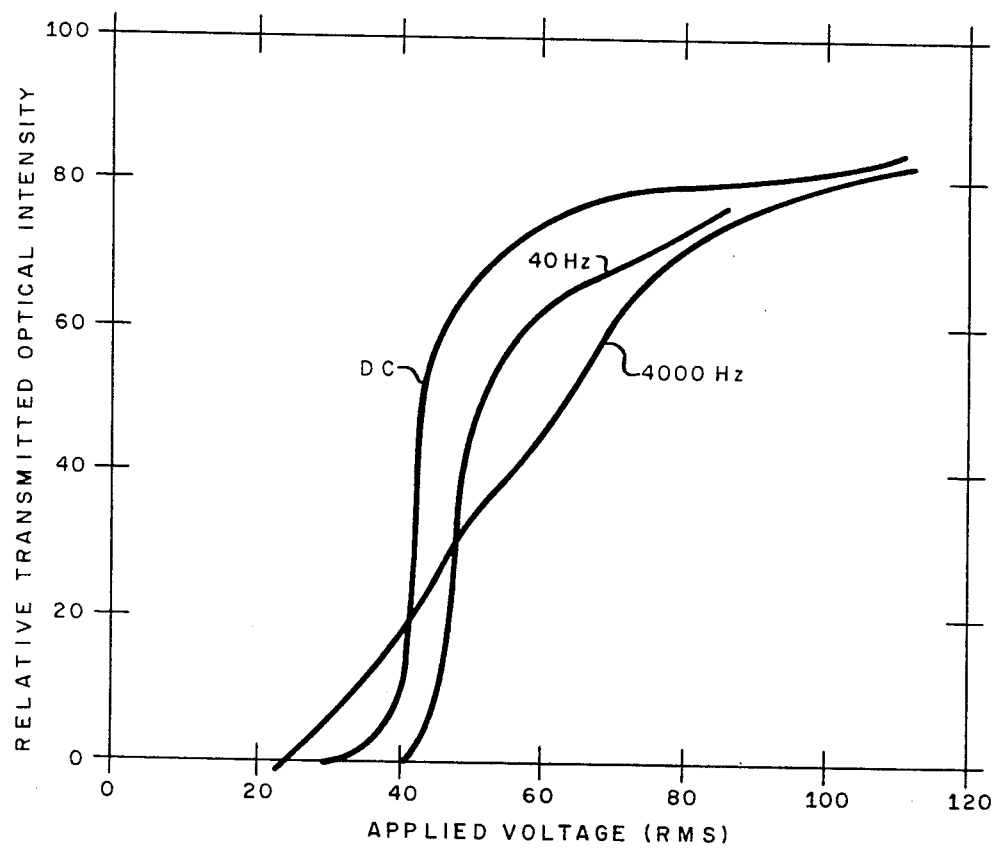
FIG. 12 is a graph useful in explaining the operation of the invention.

Characteristics of the invention are further illustrated in FIG. 12, in which transmitted optical intensity on a relative scale is plotted against the applied voltage (r.m.s. values). The transmitted intensity is the sum of all diffraction orders and is for the situation using crossed polarizers with the polarizers at ±45° with respect to the electrodes 13a, 14a, et cetera. Electrode spacing is 50 microns center to center with gaps of 25 to 30 microns. The liquid crystal material is a nitrile mixture. The graphs show behavior for direct current and 40 and 4,000 Hz situations.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Apparatus for optically displaying changes in the optical birefringence of an electric field sensitive liquid crystal comprising, a plurality of elongate electrodes, an optically transparent dielectric substrate for supporting said plurality of elongate electrodes in spaced, substantially parallel relation for permitting homeotropic alignment of the molecules of an electric field sensitive liquid crystal in the absence of an applied electric field to form a first substantially transparent state, an optically transparent dielectric wall closely spaced from and parallel to said optically transparent dielectric substrate, an electric field sensitive liquid crystal having positive dielectric anisotropy disposed between said optically transparent dielectric substrate and said optically transparent dielectric wall, said electric field sensitive liquid crystal having a sufficiently high resistivity to effectively prevent current flow therethrough, said electric field sensitive liquid crystal further having a second state substantially equal in transparency to said first substantially transparent state in the presence of an electric field whose major component is parallel to said optically transparent dielectric substrate and has an intensity above a predetermined value characterized by alignment of the molecules thereof substantially parallel to said electric field major component, means for providing an electric field between adjacent ones of said plurality of electrodes for changing the optical birefringence of said electric field sensitive liquid crystal, said electric field having a frequency such that the major component of the electric field is parallel to said optically transparent dielectric substrate, and a dielectric enclosure for hermetically sealing said optically transparent dielectric substrate to said optically transparent dielectric wall for completing the enclosure of a thin layer of said electric field sensitive liquid crystal.

2. Apparatus as described in claim 1 wherein said electric field sensitive liquid crystal has a resistivity lying substantially between $10^9$ and substantially $10^{13}$ ohm-centimeters.

3. Apparatus as described in claim 2 wherein said elongate electrodes are spaced apart from substantially 10 to substantially 40 microns center-to-center, said elongate electrodes having widths lying substantially between 30 to substantially 50 per cent of said center-to-center spacing.

4. Apparatus as described in claim 2 wherein said thin layer of electric field sensitive liquid crystal has a thickness lying substantially between 0.5 and 1.5 microns.

5. Apparatus of the kind described in claim 1 further including:
mirror means adjacent one of said optically transparent dielectric substrate or said optically transparent dielectric wall, and
optical circular polarizer means opposite said mirror means permitting passage of light through said electric field sensitive liquid crystal for providing said change in optical birefringence in the presence of said electric field major component of predetermined value.

6. Apparatus as described in claim 5 wherein said mirror means comprises diffuse reflection means adapting said apparatus for operating with diffuse light for optically displaying said characteristic of an electric field.

7. Apparatus as described in claim 5 wherein said mirror means comprises specular reflection means adapting said apparatus for operation with light from a discrete light source when optically displaying said characteristic of an electric field.

8. Apparatus as described in claim 1 further including:
optical linear analyzer means adjacent one of said optically transparent substrate or said optically transparent dielectric wall, and
optical linear polarizer means opposite said optical linear analyzer means permitting passage of light through said electric field sensitive liquid crystal providing said change in optical birefringence in the presence of said electric field major component of predetermined value.

9. Apparatus as described in claim 1 further including:
mirror means adjacent one of said optically transparent substrate or optically transparent wall,
optical linear polarizer means opposite said mirror means, and
optical linear analyzer means interposed between said mirror means and said one of said optically transparent substrate or optically transparent wall, the optical axes of said optical linear polarizer means and of said optical linear analyzer means being disposed substantially at 45° to said elongate electrodes.

10. Apparatus as described in claim 9 wherein said optical axes of said optical linear polarizer means and said optical linear analyzer means are mutually perpendicular.

11. Apparatus as described in claim 9 wherein said optical axes of said optical linear polarizer means and said optical linear analyzer means are parallel.

12. Apparatus as described in claim 9 wherein said mirror means comprises diffuse reflection means adapting said apparatus for operation with diffuse light for optically displaying said characteristic of an electric field.

13. Apparatus as described in claim 9 wherein said mirror means comprises specular reflection means adapting said apparatus for operation with light from a discrete source when optically displaying said characteristic of an electric field.

* * * * *